United States Patent
Moreno et al.

(10) Patent No.: US 6,836,111 B2
(45) Date of Patent: Dec. 28, 2004

(54) SENSOR ASSEMBLY WITH A UNIVERSAL SENSOR MODULE FOR SENSING ANGULAR POSITION OF AN OBJECT

(75) Inventors: Daniel J. Moreno, El Paso, TX (US); Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/407,073

(22) Filed: Apr. 3, 2003

(65) Prior Publication Data

US 2004/0196030 A1 Oct. 7, 2004

(51) Int. Cl.⁷ .................................................. G01B 7/30
(52) U.S. Cl. .................................. 324/207.25; 324/259
(58) Field of Search ........................ 324/207.11, 207.13, 324/207.2, 207.21, 207.22, 207.25, 228, 243, 234–235, 259; 123/612, 617; 73/DIG. 2–3

(56) References Cited

U.S. PATENT DOCUMENTS

| | | | |
|---|---|---|---|
| 5,818,223 A | * 10/1998 | Wolf | 324/207.12 |
| 5,861,745 A | 1/1999 | Herden | |
| 6,268,721 B1 | 7/2001 | Schroeder et al. | |
| 6,291,989 B1 | 9/2001 | Schroeder | |
| 6,320,374 B1 | 11/2001 | Schroeder et al. | |
| 6,346,808 B1 | 2/2002 | Schroeder | |
| 6,424,896 B1 | 7/2002 | Lin et al. | |
| 6,429,647 B1 | 8/2002 | Nicholson | |
| 6,443,020 B1 | 9/2002 | Lin et al. | |
| 6,518,750 B1 | 2/2003 | Lin et al. | |
| 6,519,549 B1 | 2/2003 | Lin et al. | |
| 6,538,429 B2 | 3/2003 | Schroeder et al. | |
| 6,566,860 B1 | 5/2003 | Lin et al. | |
| 6,576,890 B2 | 6/2003 | Lin et al. | |
| 6,639,399 B2 | 10/2003 | Schroeder et al. | |

* cited by examiner

Primary Examiner—Bot LeDynh
(74) Attorney, Agent, or Firm—Jimmy L. Funke

(57) ABSTRACT

A sensor assembly with a universal sensor module for sensing angular position of a rotatable object is provided. The universal sensor module includes a module housing. The sensor module further includes a rotatable assembly in the module housing configured to define a bore for interchangeably receiving one of the following: the rotatable object, and an interface adaptor for receiving the rotatable object. A bearing device allows rotational movement between a stationary assembly and the rotatable assembly. The sensor assembly is configured to accommodate an array of diverse sensing applications with the universal sensor module.

10 Claims, 3 Drawing Sheets

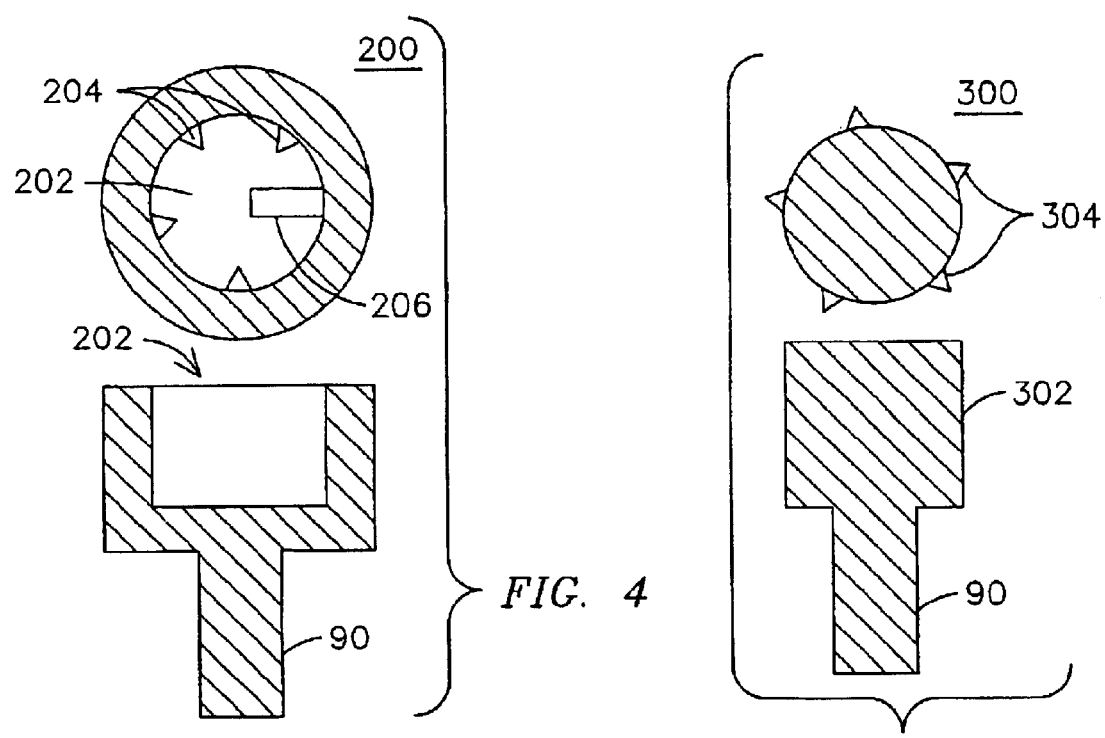
FIG. 4
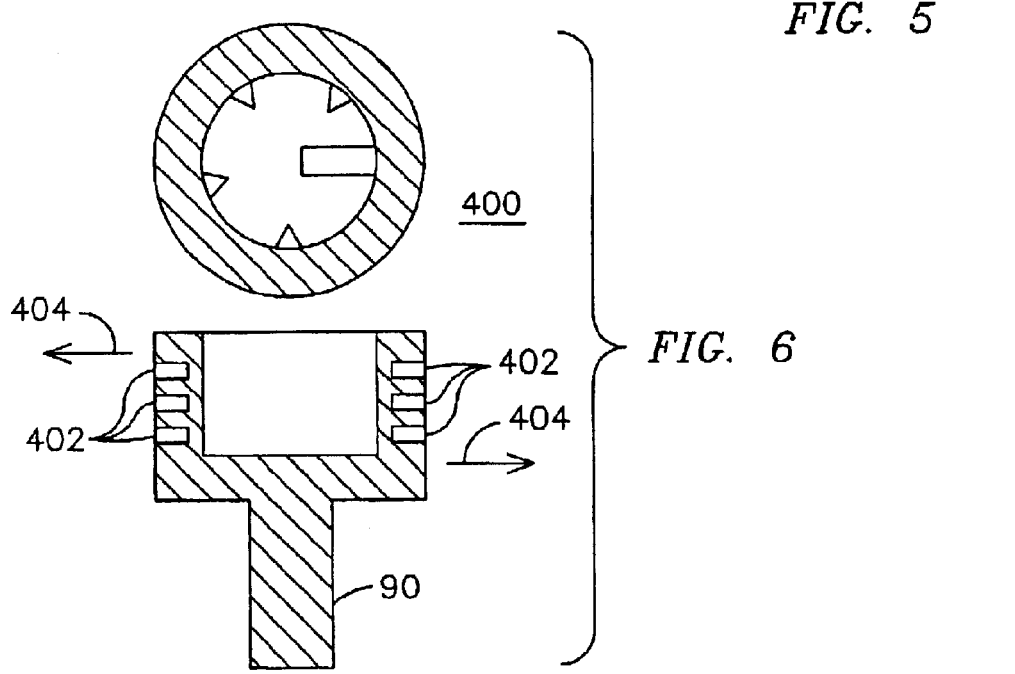
FIG. 5
FIG. 6
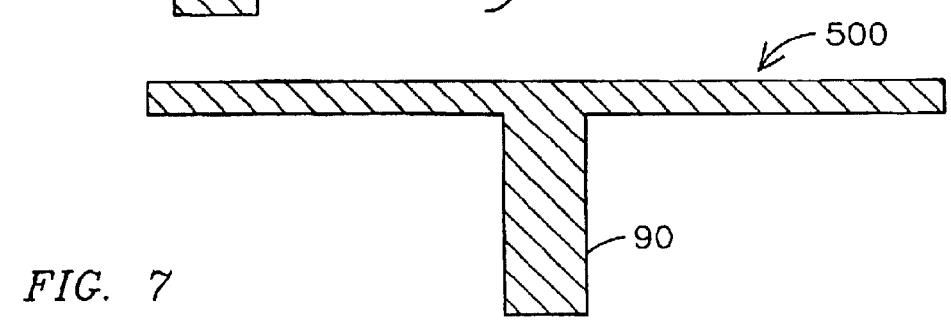
FIG. 7

SENSOR ASSEMBLY WITH A UNIVERSAL SENSOR MODULE FOR SENSING ANGULAR POSITION OF AN OBJECT

BACKGROUND OF THE INVENTION

The present invention is generally related to position sensors, and, more particularly to an angular position sensor for sensing angular displacement.

Angular position detection is required in many industrial and transportation applications, including automotive applications such as engine throttle position, automatic transmission lever position, angular position of a door or seat, etc. There are various techniques for sensing angular position of an object including optical, capacitive, resistive, inductive, and magnetic sensing techniques. Regardless of the sensing principle, known angular position sensors tend to be designed around the footprint (e.g., sensor package envelope) available for any given application, and, consequently, the sensing and packaging solutions tend to be narrowly circumscribed to the needs of each distinct application. This narrow approach typically results in time-consuming and costly redesign and qualification efforts since essentially each new application that requires a different sensor design will have to undergo new testing and qualification.

In view of the foregoing issues it would be desirable to provide a universal angular position sensor module that, for example, may be configured for balancing a myriad of tradeoffs, such as those that may occur between sensor size, weight, cost and performance. The universal module would be the "heart" of a sensor assembly that may be generically used across a multitude of sensing applications. For example, for a rotating shaft application, it would be desirable to provide a miniaturized sensor module with sufficient versatility for quick and reliable interfacing with a sensor body as well as the rotating shaft.

Being able to provide a compact universal sensor module that may reliably satisfy the performance requirements of a large number of applications is desirable for a number of reasons. For example, the universal sensor module may be manufactured in high volumes and this would lead to concomitant reductions in cost. Additionally, the universal sensor module would enable a quick design turn-around for each new application since the scope of any new design efforts would be substantially reduced. For example, for a rotating shaft application, the new design efforts may just include designing a new housing and a suitable shaft-interface adaptor. As suggested above, known approaches in the art of angular rotation sensors would unfortunately require a total redesign of the magnetic and electrical circuits of the sensor and may create a relatively high risk of performance degradation if one merely tries to reconfigure the sensor design specifically tailored for a narrow application to a different sensing application. For example, sensor performance degradation may occur due to variation in mechanical, electrical, or electromagnetic tolerances that may be acceptable for the narrow application but may not be tolerated in the new application.

BRIEF SUMMARY OF THE INVENTION

Generally, the present invention fulfills the foregoing needs by providing in one aspect thereof, a sensor assembly comprising a universal sensor module for sensing angular position of a rotatable object. The universal sensor module in turn comprises a module housing. The sensor module further comprises a rotatable assembly in the module housing configured to define a bore for interchangeably receiving one of the following: the rotatable object, and an interface adaptor for receiving the rotatable object. A bearing device allows rotational movement between a stationary assembly and the rotatable assembly, wherein the sensor assembly is configured to accommodate an array of diverse sensing applications with the universal sensor module.

BRIEF DESCRIPTION OF THE DRAWINGS

The features and advantages of the present invention will become apparent from the following detailed description of the invention when read with the accompanying drawings in which:

FIGS. 4 through 7 illustrate side and top views of exemplary embodiments of respective interface adaptors that would allow the universal miniaturized sensor module to be used in an array of diverse sensing applications.

DETAILED DESCRIPTION OF THE INVENTION

The description below assumes an exemplary packaging or assembly for an angular position sensor, as may be configured for magnetically sensing angular rotation of a rotor shaft. It is noted, however, that the broad aspects of the present invention may be readily applied to other sensing schemes as well as the sensing of angular position of any rotating object, not just a rotor shaft. The inventor of the present invention has innovatively recognized that a miniaturized sensor module 10 may be configured as a universal module that, with just relatively minor changes to an interface adaptor, may accommodate an array of diverse sensing applications, such as for detecting the angular position of a rotating shaft 50, (FIGS. 1 and 2) the angular position of a throttle, an automatic transmission lever, a pedal, a door, etc.

Figure 1:
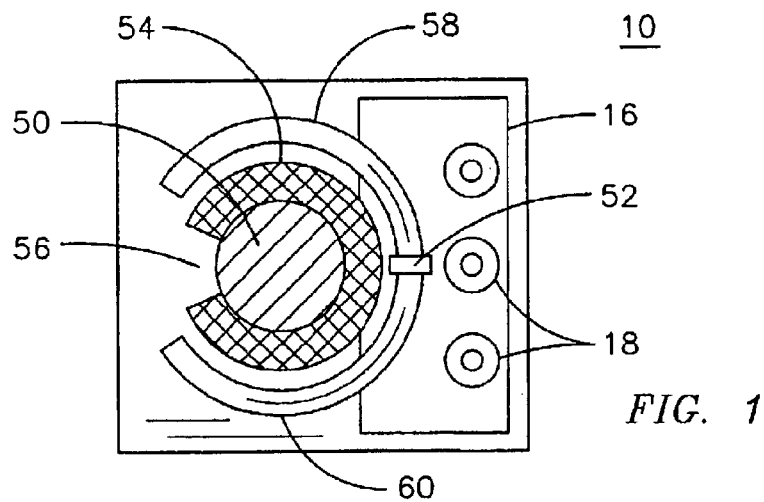
FIG. 1 illustrates a schematic representation of a miniaturized universal sensor module for sensing angular rotation of an object in accordance with aspects of the present invention and including a circuit board configured to provide electrical interface to a galvanomagnetic sensing element of the sensor module.
Figure 2:
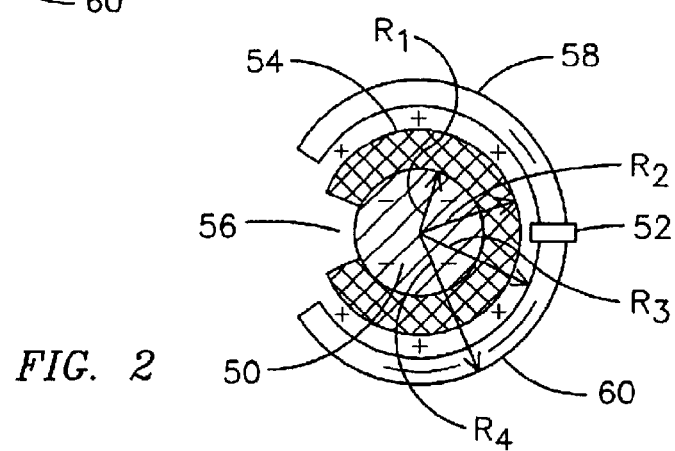
FIG. 2 illustrates exemplary radii of an arrangement for an exemplary magnetic circuit, such as may be used by the miniaturized sensor module of FIG. 1.

In one exemplary embodiment, as shown in FIGS. 1 and 2, at least one galvanomagnetic sensor 52, such as a Hall device or magnetoresistive sensing element, may sense changes in a magnetic field induced by a rotating magnet 54 affixed to the shaft 50. In another exemplary embodiment, two galvanomagnetic sensors may be spaced apart 90 degrees from one another to provide respective sinusoids (e.g., sine/cosine) signals indicative of the angular position of a rotating object. The magnet 54 may be configured as a C-shaped member. That is, magnet 54 may be configured with a gap 56 so as to not fully encircle the periphery of the shaft. In one exemplary embodiment, as represented in FIG. 2 by the plus and minus signs respectively, the outer perimeter of magnet 54 may be North polarized while the inner perimeter of the magnet may be South polarized. A magnetic flux concentrator, such as may be made up of first and second arc segments 58 and 60, defines a first gap for receiving the galvanomagnetic sensor, and a second gap is arranged to correspond with magnet gap 56. Concentrator segments 58 and 60 may be made of a material having relatively high permeability, such as ferrite magnetic material, nickel iron, silicone steel, etc., to reduce hysteresis effects. As will be appreciated by those skilled in the art, the specific sizes, geometries, and environmental capabilities of these components may vary depending on the specific needs of any given sensing application. However, it is contemplated that in one exemplary embodiment the miniaturized angular position module may comprise a quadrilateral cross-section wherein each side (e.g., represented by the letters w and h in FIG. 3) or mutually opposite sides may range from about 10 to about 25 mm. By way of example, the quadrilateral cross-section may be configured as a rectangle, or a square. It will be appreciated, however, that the present invention is not limited to quadrilateral configurations since the sensor module may take any other suitable configuration. To further exemplify the miniaturized aspects of a sensor module embodying aspects of the present invention, it is contemplated that in one exemplary embodiment, as illustrated in FIG. 2, radius R1 may be approximately 3 mm, radius R2 may be approximately 6 mm, radius R3 may be approximately 9 mm, and radius R4 may be approximately 11 mm, wherein radius R1 represents the inner radius of magnet 54, radius R2 represents the outer radius of magnet 54, R3 represents the inner radius of the flux concentrator and R4 represents the outer radius of the flux concentrator.

The miniaturized angular position module 10 in one exemplary embodiment comprises a module housing 11 that accommodates a stationary assembly (e.g., a stator assembly 12 (FIG. 3)) and a rotatable assembly, (e.g., a rotor assembly 14 (FIG. 3)). A bearing device, such as bearing sleeve or other suitable bearing 20, such as may be made of Teflon polymer or other suitable material, may be interposed between the stator assembly and the rotor assembly to allow rotatable movement therebetween. As shown in FIG. 1, the stationary assembly may include a circuit board, such as a printed circuit board (PCB) 16 with connecting points 18 for providing electrical coupling with the galvanomagnetic sensing element 52. PCB 16 may further include electromagnetic interference (EMI) protection components, such as EMI-filtering capacitors (not shown). The rotatable assembly may be configured to support the magnet 54 and mechanically interface with the object whose angular position is being measured, e.g., rotor shaft 50.

The rotatable assembly may provide a bore 55 for directly receiving the rotor shaft or for receiving a suitable interface adaptor configured to provide mechanical coupling with any given shaft. Exemplary embodiments of the interface adaptor may include interface adaptors 200, 300, 400 and 500 in FIGS. 4 through 7 respectively. In each case, the interface adaptor may include a connecting appendage 90 configured to be tightly received by bore 55 so as to establish a secure mechanical connection between the rotor assembly and the respective interface adaptor. The stator assembly may include structure (e.g., anchoring posts or openings for receiving the anchoring posts) for mechanically interconnecting the module to a suitable sensor housing.

Figure 3:
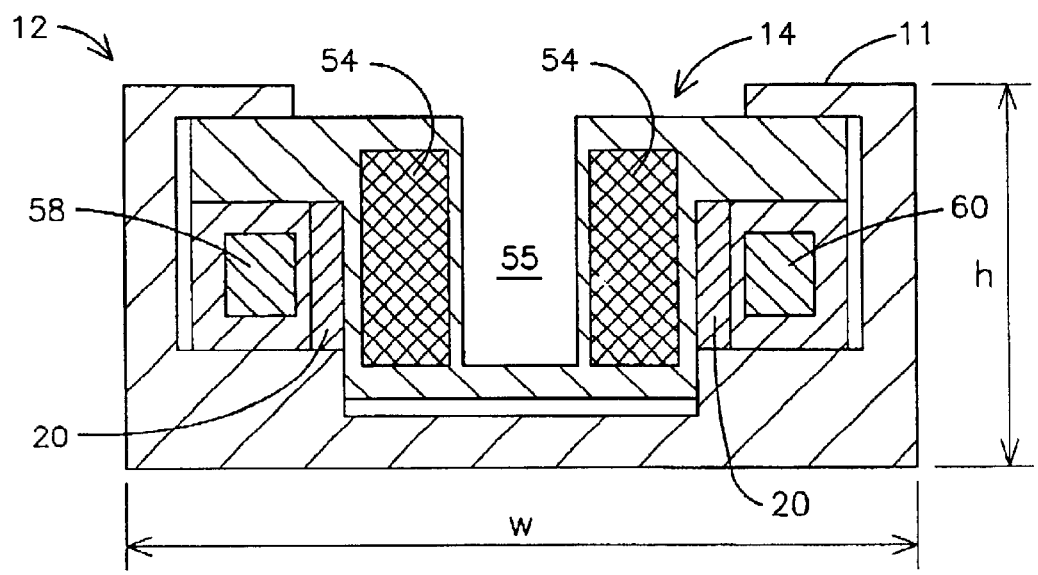
FIG. 3 is a cross-sectional view of an exemplary embodiment of the miniaturized sensor module.

In one exemplary embodiment, the miniaturized sensor module may be rigidly fastened to the sensor housing. For example, interface adaptor 200 may provide an opening 202 for receiving a solid shaft that may have a larger diameter than bore 55 (FIG. 3). If optionally desired, crushable ribs 204 may be used to provide an even stronger mechanical connection between the rotor shaft and the interface adaptor. For applications where a reference angular position is desired, an alignment tab 206 may be provided. Another example of an interface adaptor configured to provide rigid coupling between the sensor module and the rotor shaft may be illustrated by interface adaptor 300. In this embodiment, interface adaptor 300 may comprise a receiving-head 302 configured to receive a hollow shaft. The perimeter of head 302 may include crushable ribs 304 to enhance the mechanical connection between the shaft and the interface adaptor.

In alternative exemplary embodiments, relative radial movement or play such as due to shaft eccentricity may be accommodated or allowed between the sensor module and the rotor shaft. For example, in FIG. 6, interface structure 400 may be configured to include a plurality of cutouts 402 that would enable the upper portion of the interface structure to radially bend so as to tolerate some radial movement (represented by arrows 404) of the rotor shaft while providing a stiff mechanical connection relative to angular rotation of the rotor shaft.

FIG. 7 illustrates an interface adaptor 500 with a gear interface that may be useful to implement a gear connection, such as may be used if one desires to increase angular turn resolution for relatively small angular travel or to increase the angular coverage with a desired linear output range while maintaining acceptable resolution.

Figure 8:
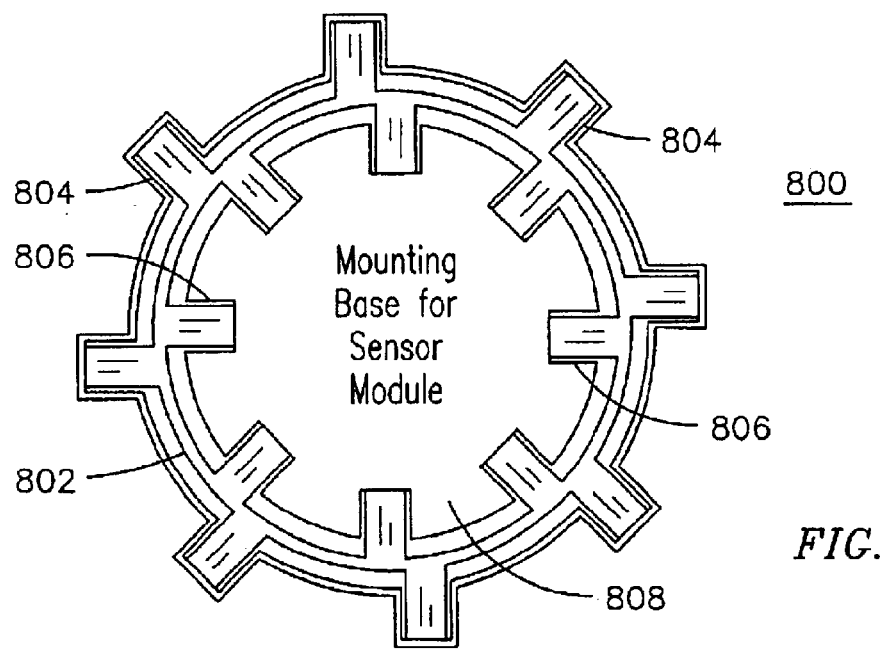
FIGS. 8 through 10 illustrate an exemplary embodiment of a mounting arrangement that would allow the miniaturized sensor module to interface with an object (e.g., rotor shaft) that may exhibit a large amount of shaft run-out.
Figure 9:
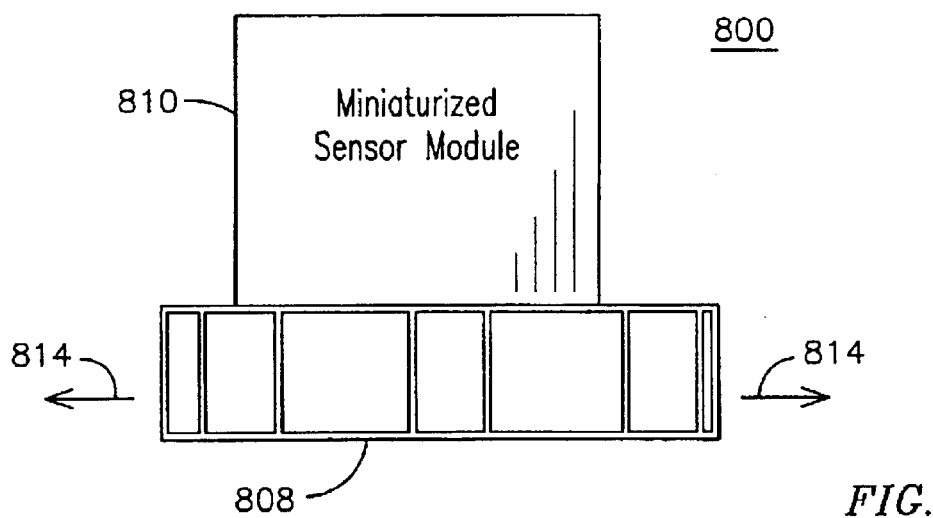
Figure 10:
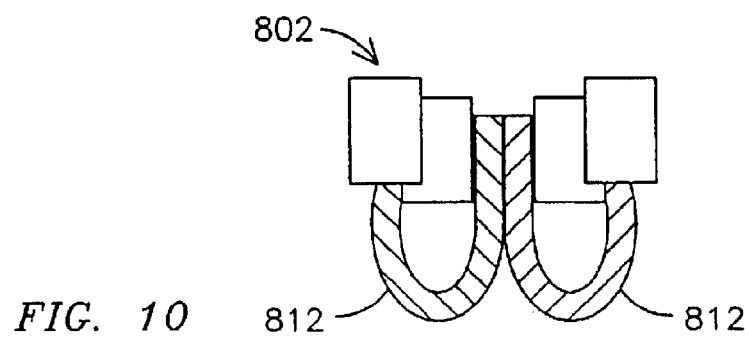

FIGS. 8 through 10 illustrate an exemplary embodiment of a mounting arrangement 800 that would allow the miniaturized sensor module to interface with an object (e.g., a rotor shaft) that may exhibit a large amount of radial play, e.g., rotor shaft run-out or shaft eccentricities. More particularly, FIG. 8 shows an elevational view of a mounting arrangement that includes a coupling ring 802 configured to engage a plurality of slots 804 constructed in the body or housing of the sensor and a plurality of slots 806 constructed in a mounting base 808 for the miniaturized sensor module. FIG. 9 illustrates a side view of a miniaturized sensor module 810 as may be assembled on the mounting base 808. FIG. 9 shows a cross-sectional view of the coupling ring 802 with radially resilient hooks or anchors 812 configured to accommodate relatively large radial play, represented by arrows 814, while providing a relatively stiff connection between the mounting base and the sensor module so that rotational movement of the rotor shaft (not shown) is accurately transmitted to the rotor assembly of the sensor module.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A sensor assembly comprising:
   a universal sensor module for sensing angular position of a rotatable object, the universal sensor module comprising:
      a module housing;
      a rotatable assembly in the module housing configured to define a bore for interchangeably receiving one of the following: the rotatable object, and an interface adaptor for receiving the rotatable object, wherein the rotatable assembly comprises a magnet configured to rotate together with the interface adaptor
      a stationary assembly; and
      a bearing device for allowing rotational movement between the stationary assembly and the rotatable assembly, wherein the sensor assembly is configured to accommodate an array of diverse sensing applications with the universal sensor module.

2. A sensor assembly comprising:
   a universal sensor module for sensing angular position of a rotatable object, the universal sensor module comprising:
      a module housing;
      a rotatable assembly in the module housing configured to define a bore for interchangeably receiving one of the following: the rotatable object, and an interface adaptor for receiving the rotatable object, wherein the rotatable assembly comprises a magnet configured to rotate together with the rotatable object or with the interface adaptor, and wherein the rotatable object comprises a shaft and the magnet comprises a C-shaped structure with a gap;
      a stationary assembly; and
      a bearing device for allowing rotational movement between the stationary assembly and the rotatable assembly, wherein the sensor assembly is configured to accommodate an array of diverse sensing applications with the universal sensor module.

3. The sensor assembly of claim 2 wherein the stationary assembly comprises a magnetic flux concentrator configured to direct magnetic flux from the magnet, and further wherein the flux concentrator comprises a C-shaped structure with a gap in correspondence with the gap defined by the magnet.

4. A sensor assembly comprising:
   a universal sensor module for sensing angular position of a rotatable object, the universal sensor module comprising:
      a module housing, wherein the module housing comprises a quadrilateral cross-section wherein each side of the quadrilateral cross-section dimensions ranges from about 10 mm to about 25 mm;
      a rotatable assembly in the module housing configured to define a bore for interchangeably receiving one of the following: the rotatable object, and an interface adaptor for receiving the rotatable object;
      a stationary assembly; and
      a bearing device for allowing rotational movement between the stationary assembly and the rotatable assembly, wherein the sensor assembly is configured to accommodate an array of diverse sensing applications with the universal sensor module.

5. The sensor assembly of claim 4 wherein each of the mutually opposite sides of the quadrilateral cross-section ranges from about 10 mm to about 25 mm.

6. A sensor assembly comprising:
   a universal sensor module for sensing angular position of a rotatable object, the universal sensor module comprising:
      a module housing;
      a rotatable assembly in the module housing configured to define a bore for interchangeably receiving one of the following: the rotatable object, and an interface adaptor for receiving the rotatable object, wherein the interface adaptor comprises an appendage to be inserted in the bore defined by the rotatable assembly, and further comprises an opening for receiving a shaft of the rotatable object;
      a stationary assembly; and
      a bearing device for allowing rotational movement between the stationary assembly and the rotatable assembly, wherein the sensor assembly is configured to accommodate an array of diverse sensing applications with the universal sensor module.

7. A sensor assembly comprising:
   a universal sensor module for sensing angular position of a rotatable object, the universal sensor module comprising:
      a module housing;
      a rotatable assembly in the module housing configured to define a bore for interchangeably receiving one of the following: the rotatable object, and an interface adaptor for receiving the rotatable object, wherein the interface adaptor comprises an appendage to be inserted in the bore defined by the rotatable assembly, and further comprises a head for receiving a hollow shaft of the rotatable object;
      a stationary assembly; and
      a bearing device for allowing rotational movement between the stationary assembly and the rotatable assembly, wherein the sensor assembly is configured to accommodate an array of diverse sensing applications with the universal sensor module.

8. A sensor assembly comprising:
   a universal sensor module for sensing angular position of a rotatable object, the universal sensor module comprising:
      a module housing;
      a rotatable assembly in the module housing configured to define a bore for interchangeably receiving one of the following: the rotatable object, and an interface adaptor for receiving the rotatable object, wherein the interface adaptor comprises an appendage to be inserted in the bore defined by the rotatable assembly, and further comprises at least one cutout for accommodating radial play of the shaft of the rotatable object, the cutout configured to provide a relatively stiff connection with respect to rotational movement of the shaft;
      a stationary assembly; and
      a bearing device for allowing rotational movement between the stationary assembly and the rotatable assembly, wherein the sensor assembly is configured to accommodate an array of diverse sensing applications with the universal sensor module.

9. A sensor assembly comprising:

a universal sensor module for sensing angular position of a rotatable object, the universal sensor module comprising:
  a module housing;
  a rotatable assembly in the module housing configured to define a bore for interchangeably receiving one of the following: the rotatable object, and an interface adaptor for receiving the rotatable object, wherein the interface adaptor comprises an appendage to be inserted in the bore defined by the rotatable assembly, and further comprises a gear interface;
  a stationary assembly; and
  a bearing device for allowing rotational movement between the stationary assembly and the rotatable assembly, wherein the sensor assembly is configured to accommodate an array of diverse sensing applications with the universal sensor module.

10. A sensor assembly comprising:

a universal sensor module for sensing angular position of a rotatable object, the universal sensor module comprising:
  a module housing;
  a rotatable assembly in the module housing configured to define a bore for interchangeably receiving one of the following: the rotatable object, and an interface adaptor for receiving the rotatable object;
  a stationary assembly;
  a bearing device for allowing rotational movement between the stationary assembly and the rotatable assembly, wherein the sensor assembly is configured to accommodate an array of diverse sensing applications with the universal sensor module;

further comprising a mounting arrangement configured to accommodate relatively large radial play that may develop at a shaft of the rotatable object, the mounting arrangement comprising:
  a mounting base for receiving the sensor module; and
  a coupling ring configured to accommodate the relatively large radial play of the shaft while providing a relatively stiff connection with respect to rotational movement of the shaft, the ring comprising a plurality of radially resilient hooks for engaging the mounting base and a body of the sensor assembly.

* * * * *